United States Patent [19]

Wilhelm

[11] Patent Number: 4,540,556
[45] Date of Patent: * Sep. 10, 1985

[54] DUAL ALKALI SCRUBBER LIQUOR REGENERATION WITH PRODUCTION OF GYPSUM

[75] Inventor: James H. Wilhelm, Sandy, Utah

[73] Assignee: Central Illinois Public Service Company, Springfield, Ill.

[*] Notice: The portion of the term of this patent subsequent to Jul. 31, 2001 has been disclaimed.

[21] Appl. No.: 636,348

[22] Filed: Jul. 30, 1984

Related U.S. Application Data

[63] Continuation-in-part of Ser. No. 503,040, Jun. 10, 1983, Pat. No. 4,462,969.

[51] Int. Cl.³ .................... C01B 17/00; C01B 17/45; C01B 17/62
[52] U.S. Cl. .................................. 423/242; 423/166; 423/512 A; 423/519
[58] Field of Search .......... 423/242 A, 242 R, 244 A, 423/244 R, 512 A, 519, 166

[56] References Cited

U.S. PATENT DOCUMENTS

| | | | |
|---|---|---|---|
| 3,961,021 | 6/1976 | Morita et al. | 423/166 |
| 3,965,242 | 6/1976 | Morita et al. | 423/166 |
| 4,462,969 | 7/1984 | Wilhelm | 423/242 |

*Primary Examiner*—Gregory A. Heller
*Attorney, Agent, or Firm*—Robert R. Finch

[57] ABSTRACT

A process for the recovery of gypsum as a product of a dual alkali system for regeneration of a sodium base alkaline scrubber liquor in which the liquor reacts with ground limestone in two serially connected sludge blankets containing from 15%–40% solids in a liquor matrix and overlain by a relatively clear supernatant pool. Upon completion of regeneration the liquor is discharged from the second blanket to the scrubber cycle while a proportionate amount of the slurry is further treated to reduce its pH and/or increase its density and/or to displace regenerated scrubber from the matrix after which the slurry is transferred to a separate tank and there oxidized to gypsum then it is filtered. The filtrate is returned to the liquor regeneration cycle and the gypsum recovered as product.

5 Claims, 2 Drawing Figures

DUAL ALKALI SCRUBBER LIQUOR REGENERATION WITH PRODUCTION OF GYPSUM

RELATED APPLICATIONS

This application is a Continuation-in-Part of my copending application, Ser. No. 503,040 filed June 10, 1983 for Regeneration of Sulfur Dioxide Scrubber Liquor which issued July 31, 1984 as U.S. Pat. No. 4,462,969.

FIELD OF INVENTION

This invention relates generally to the so-called dual alkali gas scrubbing systems for removal of $SO_2$ from flue gases in which a sodium based liquor absorbs $SO_2$ in the scrubber then is regenerated by reaction with a calcium bearing compound. More particularly, the invention relates to an improved dual alkali system of the type described that includes an oxidation stage for the production of gypsum from the calcium bearing solids discharged from the liquid regeneration step.

Said patent discloses and claims a dual alkali system of the type described in which the calcium-bearing compounds used for regeneration (recausticizing) of the sodium based scrubber liquor comprise crushed limestone and the regeneration reactions are carried out in two successive zones in each of which is maintained a sludge blanket containing 15% to 40% by weight solids. Limestone solids are introduced into the top area of the sludge blanket while the liquor undergoing regeneration is introduced into the lower part of the blanket and diffuses upwardly therethrough to exit the reactor via an overflow weir. The blanket or layer of solids is stirred gently by appropriate devices such as rake arms which support and move rake blades to urge solids across the tank bottom to a central exit cone through which they exit to a filter thence to landfill or other use. Filtrate from the filter contains scrubber liquor so is returned to the regeneration system.

In one embodiment of my patented process, all of the scrubber bleed liquor is introduced into the first reaction blanket then later introduced into the second blanket. In another embodiment of the process, the scrubber bleed liquor is divided with about one half going into the first blanket and the balance going directly into the second blanket. Both modifications are accommodated by this invention. The process is characterized by relatively short detention time for liquor, say 170 minutes maximum, and long detention time for solids, say up to 24 hours.

STATEMENT OF THE PRIOR ART

There are several systems that may be classified as dual alkali systems. Most of them use a sodium based scrubber liquor and slaked or unslaked lime as the calcium compound but some use limestone. All of the processes of which I am aware, other than that disclosed in my own U.S. Pat. No. 4,462,969, discharge the calcium compounds from the regeneration zones as a relatively dilute slurry on the order of only two percent solids. This means that the slurry contains much valuable regenerated liquor that must be separated before the solids are oxidized to gypsum, otherwise the sodium in the liquid will all oxidize to the $Na_2 SO_4$ form which is ineffective in the scrubber. Additional soda ash is required to make up for this loss of scrubber liquor. Separation involves a filtration step to recover the liquor then the calcium solids cake must be repulped for oxidation and then, after oxidation, must be refiltered to recover the gypsum solids. The required additional filtration is costly and usually renders the procedure uneconomic.

Although the process as disclosed in my patent 4,462,969 does discharge solids from the regeneration step in a more concentrated slurry (15% to 40% solids) than do the other prior methods (about 2% to 3% solids), nevertheless, direct oxidation of the slurry still results in an unacceptable loss of regenerated sodium based scrubber liquor unless the process of this invention is used.

A process, such as provided by this invention, which enables oxidation of the calcium bearing slurry discharged from the liquor regeneration step without any intervening filtration step or significant loss of regenerated liquor would provide a real economic benefit to users of dual alkali systems. This is so because in many areas the gypsum is directly useable for wall board manufacture, but even if there is no local market for gypsum, it is much easier to handle and dispose of in landfill than is the $CaSO_3$ - $CaSO_4$ solids mixture yielded by the liquor regeneration without oxidation to gypsum.

So far as I am aware, the most pertinent prior art to this invention is my patent, 4,462,969.

SUMMARY AND BRIEF DESCRIPTION OF THE INVENTION

It is the primary object of this invention to provide a dual alkali $SO_2$ gas scrubber system in which a sodium based alkaline scrubber liquor absorbs $SO_2$ from gases in a scrubber then is regenerated by reaction with a calcium compound. The resulting calcium compound slurry is oxidized to gypsum and the liquor returned to the regeneration cycle without significant loss of active regenerated liquor. Thus, relatively inexpensive limestone is used in the gas scrubbing-regenerating system then converted to a valuable product, gypsum.

Another important object is the provision of ways and means by which limestone may be used as the source of calcium in a dual alkali system of the type described then converted to gypsum.

For purposes of this discussion, essential reactions are: In the scrubber:

$$Na_2SO_3 + SO_2 + H_2 \rightarrow 2NaHSO_3 \tag{1}$$

(due to oxidation some $Na_2 SO_4$ is also produced)
In the recausticizing stage:

$$NaHSO_3 + CaCO_3 \rightarrow CaSO_3 + Na_2SO_3 + CO_2 + H_2O \tag{2}$$

$$3/2H_2O + Na_2SO_4 + CaCO_3 \rightarrow CaSO_4 + 2NaOH + CO_2 + \tfrac{1}{2}H_2O \tag{3}$$

and in the oxidizer where gypsum is formed:

$$CaSO_3 + \tfrac{1}{2}O_2 \rightarrow CaSO_4 \tag{4}$$

$$Na_2SO_3 + 1/2O_2 \rightarrow Na_2SO_4 \tag{5}$$

Make-up sodium in the form of soda ash is added to the scrubber liquor after equations (2) and (3) are completed.

After equations (4) and (5) are completed, the resulting gypsum is discharged and the oxidized scrubber liquor is returned to the regeneration reactors via the conduit 30.

In its simplest form, the invention comprises the steps of establishing two serially connected reaction stages and using well known techniques to establish in each stage a sludge layer or blanket containing about from 15%–40% but preferably about 25% solids including ground limestone along with the solid and liquid products of the reactions between limestone and scrubber bleed liquor according to equations (2) and (3) above. The limestone solids and scrubber bleed liquor are introduced into the sludge layer in the first stage at distinctly different elevations. The liquor is introduced in the lower portion of the sludge blanket and the limestone solids at a higher elevation into the upper portion or even onto the top of the sludge blanket. Since liquor continuously overflows from the reactor tank, the incoming liquor will rise up through the sludge blanket to the supernatant zone essentially counter currently to the solids which migrate downwardly into the sludge blanket.

Supernatant liquor and sludge are separately transferred from the first stage to the sludge blanket in the second stage wherein reaction continues to completion concomitantly with separation of the liquid and solid fractions by sedimentation. The liquor, which may be further clarified, is, after addition of make-up soda ash, recycled to the scrubbers. In accordance with the invention and as hereinafter discussed in greater detail, before the slurry of settled solids reaches discharge adjustment is made in the solids concentration, dilution of the liquor matrix and/or the pH.

Important requirements of the process are the maintenance of two sludge blankets and introduction of the limestone and liquor into distinctly different relative elevations in the sludge blankets. It is necessary that the bleed liquor be introduced into submergence in a lower part of the sludge blanket at an elevation significantly below that at which limestone initially enters the blanket. Thus, a limestone slurry, typically at a pH of 7–8, may be supplied onto the top of the sludge blanket while the scrubber bleed liquor, at a usual pH of 5.5 is injected at or near the bottom of the blanket where pH is in a range from 5.9–6.1. A vertical pH gradient is thus established in the blanket. The residence time of liquor and solids is adjusted to achieve the desired result as to degree of completion of reaction and particle size growth.

In the blanket, conditions favor reaction in accordance with equations (2) and (3) above both of which result in release of CO gas that stirs the reaction mass and tends to suspend fine solids. As the reaction proceeds, the solid reaction products grow, both by agglomeration and by precipitation onto smaller crystals. Growing solid particles mix with and settle into the sludge blanket where they are retained for continued reaction and growth until withdrawn.

The sludge blanket provides several advantages. First, it brings the solids close together in a matrix of liquor, thus encouraging reaction and solids growth as the reaction proceeds. In addition it screens and thus restrains fine solids from escaping the sludge blanket and eventually the reactor. Finally, it results in concentrated slurry at discharge which in turn reduces to amount of liquor in slurry sent to the oxidizer.

Use of the sludge blanket with a high solids concentration also provides the advantage that for a given tank the liquor residence time can be relatively short yet the solids residence time is long, usually a multiple of the liquor residence. For instance, in the first stage, liquor residence is 50–60 minutes and in the second stage may be up to 170 minutes. At the same time, in both stages the total solids residence is 6–24 hours. Of this the solids residence in the first stage is 30 to 180 minutes and in the second stage is 2 to 24 hours. The relatively long solids residence maximizes time for reaction and crystal growth while the relatively low sludge volume minimizes tank requirement as does the short liquor residence time.

It is important that reaction conditions in the reaction stages be controlled to achieve the desired end result which may be summarized as:
(1) Less than 10% unreacted $CaCO_3$
(2) Final solids filter cake of at least 60% by weight solids
(3) Less than 500 ppm suspended solids in the second stage effluent
(4) pH of about 6.2 in second stage effluent.

Maintaining the second stage effluent at a pH of about 6.2 is important. If the pH of the second stage effluent drops significantly below 6.2, say to 6.0, the volume needed in the scrubber may increase by as much as 50% with a consequent increase in volume to be handled throughout the system. A second stage effluent with a pH much above 6.2 usually reduces the reaction rate so much that it is difficult to achieve an acceptable degree of limestone reaction.

The pH is controlled by regulating conditions in the first stage. That is, in the first stage the residence time of solids and liquor as well as the ration of limestone to bleed liquor and agitation are regulated as necessary to control and adjust the pH of the second stage effluent to maintain it at the desired level near 6.2. The most important regulation is the ratio of limestone to bleed liquor in the first stage. The residence and ration of limestone and bleed liquor in the first stage and the degrees of agitation are then adjusted so that the second stage effluent has a pH at or near 6.2. This usually results in maintaining the first stage effluent in a pH range of 6.3 to 6.5.

For operation, the supply of bleed liquor to the first stage is fixed and regulation is achieved by adjusting the limestone supply rate. If the pH of the second stage effluent gets too high the limestone addition to the first stage is decreased. If the pH drops much below 6.2, say to 6.0, the rate of limestone addition in the first stage is increased. In both cases the rate of bleed liquor supply remains constant. Results of adjustments to the limestone bleed liquor ratio in the first stage do not show up in the second stage effluent for at least 30 minutes and sometimes it takes as long as 60 minutes.

Residence time of liquor, particularly in the first stage is important. In general, I have found that, with a grind of limestone of essentially minus 325 mesh, a liquor residence time of 50–60 minutes in the first stage yields optimum results. Less than 50 minutes is too short for adequate reaction and a liquor residence longer than 60 minutes is unnecessary and merely increases costs for tankage and space without any benefits. Keeping liquor resident in the first stage 50 to 60 minutes and adjusting the other variables to achieve the 6.2 pH in the liquor overflow from the second stage results in reaction of at least 50–70 % of the limestone in the first stage. This is the desired first stage goal and sets conditions for the second reaction stage.

The second stage reactor is sized to permit an increased liquor residence time on the order of three times that of the first reactor. Using average liquor residence times of 160 minutes in the second stage, and regulating conditions in both the first and second reactors to maintain a pH near 6.2 in the second stage effluent, the resulting quantity of unreacted limestone ($CaCO_3$) in the final filter cake will be low—in the 3-8% range; and the suspended solids content of the final thickener overflow will also be kept low—below 400 ppm.

For unique situations such as accommodating systems in which the first reaction tank is smaller than the second tank, (as opposed to the case where the second reactor is equal to or larger than the first) a special embodiment of the invention is provided in which the conditions in the two reaction stages are selected so gas evolution and resulting violent reaction that might otherwise occur in the second stage are minimized. This embodiment requires that all the limestone be added to the sludge blanket in the relatively smaller first reactor where it is mixed with only a portion of the total scrubber bleed liquor volume. The quantity of scrubber bleed liquor added to the first stage should be less than one-half the stiochiometrical requirement for reaction with the entire calcium content of all the limestone. In the first reaction stage, conditions are established so the initial contact of scrubber bleed liquor and limestone occurs in a sludge blanket under conditions of gentle agitation or kneading. The liquor is added to the lower part of the blanket and the solids to the top.

Since the first tank is relatively small compared to the second tank, it is important that only part of the bleed liquor be added to the first stage. If too much is added, the reactions are violent and so much $CO_2$ gas generated that excess fines, a large part of which are unreacted, are carried over to the second stage and eventually into the final regenerated scrubber liquor from which they must be removed by some means lest they foul the system by scaling. Moreover, even though the fine $CaCO_3$ is subjected to further reaction in the second stage, there is still an undesirably high percentage of unreacted $CaCO_3$ in the final solids discharged to waste from the final reaction blanket.

In both embodiments of the process the slurry at the point of discharge from the final reaction zone is at a concentration of from 15%-40% solids.

In the embodiment in which all the bleed liquor is added to the first blanket, the pH of the slurry at discharge from the second reactor is at about the pH of liquor discharge from the first zone. In the typical case where incoming bleed liquor is at pH of 5.5, the pH of effluent from the first stage as well as the bottom of the second stage blanket is about 5.9.

In the embodiment where the bleed liquor is first divided then directly introduced into both blankets, the pH of the slurry at the bottom of the second blanket adjacent the discharge point, is essentially the same as that of the scrubber bleed liquor. Thus, if scrubber bleed liquor is at pH of 5.5 then the final slurry at second stage discharge is also about 5.5.

Theoretically, a lower pH favors oxidation of the slurry in the oxidation vessel. The significance of pH on the oxidizing reactions will be determined emperically for each case. If tests show a lower pH to be important, then the pH of the second stage slurry discharge may be adjusted by injecting a portion of scrubber bleed liquor into the slurry adjacent the second stage discharge, preferably into the discharge cone.

In accordance with this invention, in both embodiments of the process, adjustment of the slurry concentration and/or dilution of the liquor matrix at the discharge are made.

Increase in concentration is achieved by regulatings conditions in the reactor to maximize concentration. Also, further compression of slurry in the discharge concentration can be accomplished by additional kneading of the sludge as it approaches the cone or in the cone itself.

Dilution of the liquor matrix is accomplished by injecting water into the slurry in the cone. Since the liquor leaves the reaction vessel by an upper overflow weir, the injected water will move upwardly through the slurry displacing a large part of the liquor matrix as it does so. The result is that with any given volume of slurry, the net amount of active sodium leaving the reactor is reduced. Water should be injected at the same rate as the liquor in the slurry would discharge from the reactor if it was not displaced.

In determining the amount of dilution and/or increased slurry density needed, some preliminary observations must be made. First, it is necessary to establish how much fully oxidized adsorbed $SO_2$ can be tolerated in the circulating scrubber liquor. Although this is somewhat arbitrary, it is usual to establish 30% as the top limit. Fully oxidized $SO_2$ in the liquor comes from two sources. First, from the scrubber itself as indicated in the equations set forth earlier. The percent of this varies but it is usual for sodium sulfate, which is the form in which the fully oxidized absorbed $SO_2$ appears, to vary from 5% to as high as 15% of the total $SO_2$ adsorbed. If there is a total of 30% oxidized $SO_2$ as the ceiling, then the maximum of fully oxidized $SO_2$ that can be tolerated from the gypsum oxidizer will be in the range from 25% to 15%.

Initially, the steps to be taken to adjust the various control points will be determined empirically. Thereafter the system can be operated within the established guide lines. As a practical matter, the ceiling on acceptable oxidized $SO_2$ is that amount above which extra soda ash must be added to effect an acceptable removal of SO while operating within the scrubber capacity.

In order that the invention may be more readily understood and carried into effect reference is made to the accompanying drawings and description thereof which are offered by way of example only and not in limitation of the invention the scope of which is defined by the appended claims and equivalents embraced therein rather than by any preceding description.

IN THE DRAWINGS

Figure 1:
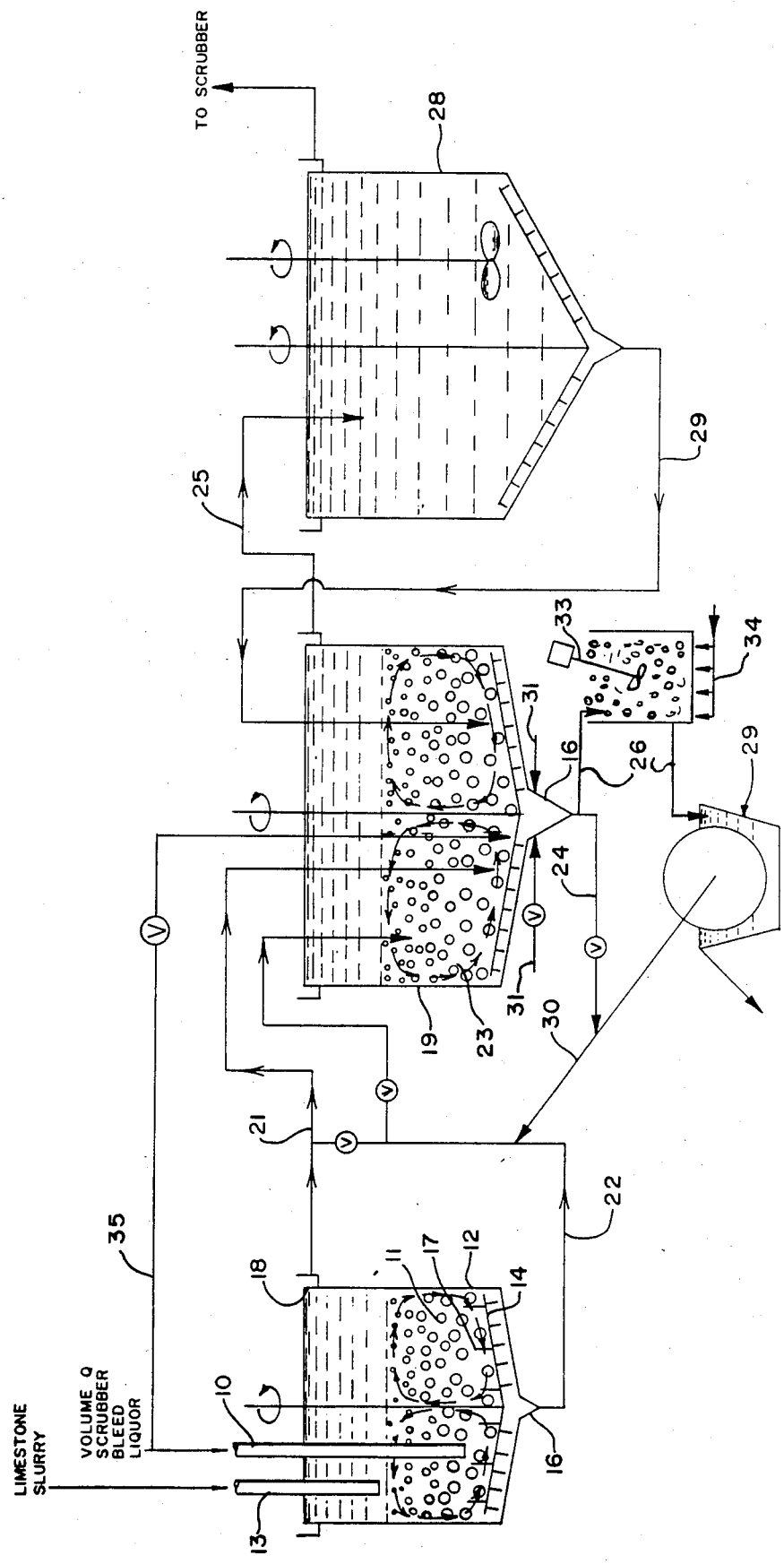
FIG. 1 is a flow diagram of a preferred embodiment of the invention.

In the flow sheet illustrated in FIG. 1, a volume Q of scrubber bleed liquor containing $SO_2$ as $Na_2SO_3$ and $NaHSO_3$ is introduced via a conduit 10 into submergence in the lower portion of an ever changing sludge blanket 11 maintained in a first reactor 12. In the blanket, the liquor mixed with a slurry of ground limestone introduced via a suitable conduit 13 near or onto the top of the sludge blanket 11.

Limestone is supplied in an amount approximately equal the stiochiometric amount of $SO_2$ absorbed by bleed liquor in the scrubber. Reaction in the sludge blanket is enhanced by the gentle mixing effected by the rake assembly 14 which kneads the sludge and moves it toward the center outlet cone 16 of the reactor. If desired, additional stirrers 17 can be provided. Such additional stirring devices will move slowly to mix the reactants to promote solids growth and to increase the concentrations of the final sludge. A separate mixer (not shown) may be used, but care must be taken to avoid stirring so fast that crystal or flocs are broken.

From the first reactor a volume of liquor about equal to the original incoming bleed liquor discharges to a second reactor 19 via a conduit 21. At the same time a volume of sludge from the blanket 11 is transferred via a suitable conduit 22 to mix with the liquor in conduit 21 thence into the second reactor 19 where it is introduced into submergence in the sludge blanket 23 therein. If necessary to increase reaction or enhance control, the sludge and effluent liquor may be transferred separately to the second reactor. In such a case, the liquor would be introduced into the lower portion of the sludge blanket in the second reactor and the sludge at or near the top of the blanket.

Sludge from the second stage reactor may be recycled to the second stage blanket through a conduit 24 as needed to keep the system in balance, maximize consumption of limestone and clarity of regenerated liquor. A quantity of sludge proportional to new solids supplied by the incoming fresh limestone is discharged from the system via line 26 to an oxidizer tank 32. The resulting gypsum solids are recovered on a filter 29 from which they exit the system while the filtrate is returned to process via conduit 30.

Prior to discharge from the second stage, the solids slurry is adjusted as to pH, density and the dilution of the liquor forming the slurry matrix.

To adjust pH, a separate stream of scrubber bleed liquor is injected into the central bottom portion of the second sludge blanket.

To increase slurry density, the second reactor is operated for a period with restricted solids discharge until a satisfactory handleable density is achieved.

To decrease the amount of active sodium in the slurry, water is introduced into the discharge cone 16 through a plurality of valved conduits 31. The water diffuses upwardly through the slurry toward the overflow weir thus displacing regenerated liquor from the slurry.

Make-up soda ash is added in a final clarifier-mixer 28 in which additional clarification may be carried out as desired for final polishing. Solids from this tank are returned via conduit 29 to the second sludge blanket.

In typical tests conducted on systems not employing the final adjustments of this invention: In the first stage the liquor residence time was 56 minutes, and the effluent pH was 5.9 while in the second stage the liquor residence was 150 minutes and the effluent pH was 6.1. The unreacted $CaCO_3$ was 12.9% and the final clarifier suspended solids was about 420 ppm. The waste solids filtered to yield a discharge cake of 63.7% solids dry weight. These are relatively short tests of only 7 hours duration. In the usual case the sludge residence is up to 24 hours and this has been shown to reduce unreacted $CaCO_3$ to well below 10% and the suspended solids to well below 400 ppm.

Solids concentration in the sludge blankets is in the broad range of 15%–40% by weight, but preferably in the range of 20%–30%. This forces solids into close proximity thus encouraging growth by agglomeration and by precipitation onto existing solids. Th blankets also insure long solids residence time thus insuring substantially complete reaction - above 95%. The liquor separately overflows the exit launder after a relatively short residence time. Typically, liquor residence is in the range of 30 to 180 minutes while the solids residence time is 6 to 24 hours. Both times will vary depending on conditions of reaction such as pH and limestone size consist.

Figure 2:
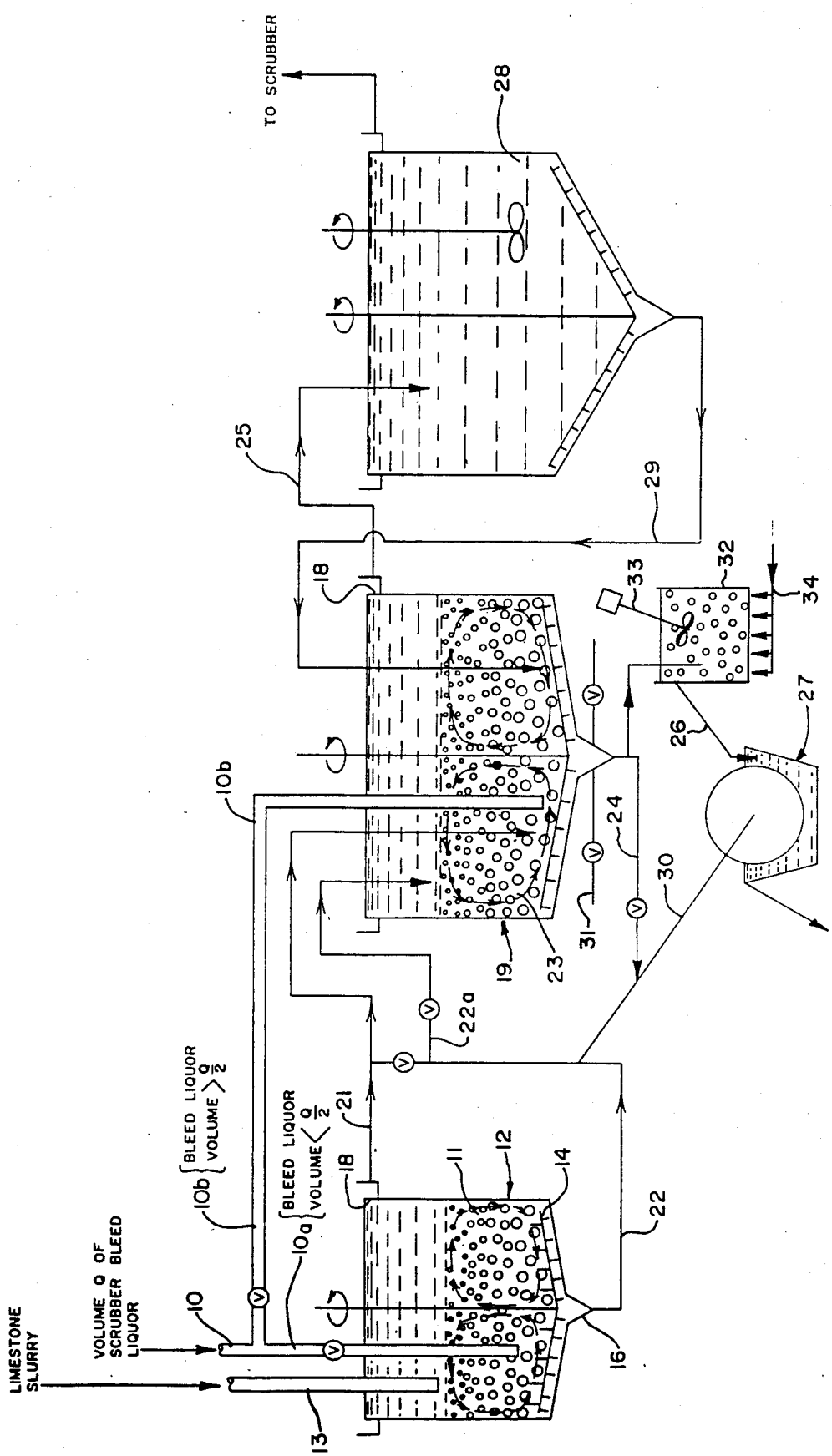
FIG. 2 is a flow diagram of another embodiment of the invention useful in certain situations.

FIG. 2 illustrates a special embodiment of the invention in which the bleed liquor is split into two streams that are supplied separately to the two reactors, while all of the limestone is added to the first stage. This embodiment is especially useful in situations where, for one reason or another, a relatively smaller first stage reaction tank is to be used. In such a case, if all the liquor is added to the relatively smaller tank, there will be a decreased liquor residence time for a given throughput. This will in turn result in incomplete reaction. Also, in addition to reducing reaction time, the higher throughput rate results in dilution and expansion of the sludge blanket thus severely impairing its effectiveness.

As illustrated in FIG. 2, the system includes liquor feed conduits 10, and 10B, which inject scrubber bleed liquor simultaneously into submergence in the lower part of a sludge blanket 11 maintained in a first tank 12 and the blanket 23 in the second tank. Limestone slurry is introduced, via a conduit 13, onto or near the top of the first sludge blanket. In the first reactor tank, the solids are lightly stirred by a rake assembly 14 that moves them toward the tank center cone 16.

Solids discharged at the center outlet 16 of the first tank are conducted by conduit 22 to merge with liquor overflowing the first tank at the weir 18 thence into a conduit 21 through which the mixture is supplied to the second reactor 19. If desired, the solids and overflow liquor can be conducted separately to the second reactor via conduit 21 and a branch conduit 22a.

A sludge blanket 23 is maintained in the second reactor 19. If the solids and liquor from the first stage are separately introduced into the second reactor then the liquor is injected into a lower part of the sludge blanket 23 and the sludge onto or near the top of the sludge blanket. Reaction occurs within the sludge blanket. Regenerated liquor discharges from the second reactor at overflow weir 18 thence flows via conduit 25 to the mix tank 28 where makeup soda ash is added and final polishing, if desired, is effected by sedimentation. From the tank 28, regenerated liquor returns to the scrubbers while settled solids are returned via conduit 29 to the second stage reactor.

The limestone slurry is injected via conduit 13 onto or near the top of the sludge blanket while the bleed liquor is injected via conduit 10b into a lower portion of the sludge bed well below the elevation at which limestone enters the blanket.

Reaction conditions in the first reactor are maintained such that the final effluent from the second reactor has a pH at or near pH 6.2. In the first reactor, the reaction is carried far enough toward completion that violent reaction with concomitant excessive gas evolution in the second state is minimized. This is accomplished by keeping the bleed liquor addition to the first stage well below, less than one-half of, the stiochiometrical quantity needed to react with the total added limestone. The reaction in the first stage definitely takes the "edge" off the reaction mass so that in the second reactor the reactions are less violent. As noted, the bleed liquor supplied to the first reactor via conduit 10a is less than one-half the stiochiometric quantity for reaction with the limestone. The quantity is adjusted so that CO2 gas evolution is kept under control. The balance of bleed liquor - at least one-half Q, - is conducted, via conduit 10b, directly to the second reactor where it is introduced into the lower part of the sludge blanket and mixes therein with reaction products from the first reactor which include first stage sludge blanket material (about 25% solids) discharged via conduit 22 and the first stage effluent discharged via weir 18 and conduit 21 into submergence in the second stage sludge blanket 23.

Reaction in the second stage is carried to substantial completion (less than 6% unreacted limestone). This is accomplished by residence time control and by monitoring the final effluent pH to be certain it stays close to pH 6.2.

From the second reactor sludge blanket material discharges via the center outlet and conduit 26 to an oxidizer 32. A mixer 33 agitates the tank contents and air is injected through the tank bottom through a plurality of tubes 34. Detention time is selected to achieve full oxidation of the slurry. Oxidized slurry flows via conduit 26 to a fliter 29 wherin the gypsum is separated from the liquid. The gypsum is removed to further use while the liquor is returned via conduit 34 to the regeneration reactors.

Numerous tests were made utilizing the system illustrated in FIG. 2 but without the final adjustments of this invention.

In such tests, a 12" diameter vessel was used for the first stage and an 18" diameter vessel for the second stage.

The limestone slurry was made up from $-200$ mesh stone and simulated bleed liquor was made up as described supra in connection with the FIG. 1 system.

In typical tests, in the first stage, liquor residence averaged 54 minutes, effluent pH was 6.2-6.3 while in the second stage, liquor residence time averaged 150 minutes, the effluent pH was 6.2, the unreacted limestone (CaCO3) ranged from 3.0-12.2%; and the final clarifier effluent contained an average suspended solids less than 300 ppm. The dry solids content of the waste filter cake ranged from 67.7 to 62.5 weight percent. The test where unreacted CaCO3 was 12.2%, was of short duration (7 hours). In tests of duration over 24 hours, the increased solids residence time reduced the unreacted $CaCO_3$ below 6%.

As noted herein the requirements to satisfy some of the process variables may have to be determined empirically. For instance, to supply the striochiometric amount of limestone may require an excess of two to three percent over the calculated amount of limestone. Use of the term stiochiometric in connection with limestone is intended to encompass that variation.

I claim:
1. The continuous process for regenerating spent sulfur dioxide gas scrubber bleed liquor that contains $NaHSO_3$ and $Na_2SO_3$, by reacting said bleed liquor with a calcium compound which process comprises the steps of providing said calcium as a calcium carbonate slurry formed from limestone, establishing and maintaining respectively in serially connected first and second reaction zones first and second sludge blankets each containing from about fifteen to about forty percent by weight solids overlain respectively by first and second supernatant liquor pools-containing less than about two percent by weight solids, subjecting said sludge blankets to gentle agitation to effect mixing of the sludge, continuously introducing said calcium carbonate slurry into an upper portion of said first sludge blanket below said first supernatant pool while continuously introducing into submergence in a lower portion of said first sludge blanket a stream of said scrubber bleed liquor, withdrawing supernatant liquor from said first supernatant pool and introducing it into submergence in the lower portion of said second sludge blanket, withdrawing sludge from said first sludge blanket and introducing the same into an upper portion of said second sludge blanket, retaining said sludge in said sludge blankets for a time sufficient to yeild therein reaction products that include calcium sulfite, withdrawing regenerated scrubbing liquid from said second supernatant pool and sludge from said second sludge blanket in amounts proportional respectively to the amounts of bleed liquor and limestone supplied to said reaction zones and subjecting said last named sludge to oxidation to convert the calcium sulfite therein to calcium sulfate.

2. The process according to preceding claim 1 characterized by the step of adjusting the pH of said sludge withdrawn from said second sludge blanket to be nearer to the pH of said scrubber bleed liquor supplied to said first sludge blanket before said sludge is subjected to oxidation.

3. The process according to preceding claim 2 in which said adjustment of pH is accomplished by diverting a portion of said stream of scrubber bleed liquor to bypass said first reaction zone and mixing it directly with said sludge withdrawn from said second sludge blanket.

4. The process according to preceding claim 1 characterized by the step of increasing by stirring the density of sludge withdrawn from the second sludge blanket before subjecting said sludge to oxidation.

5. The process according to preceding claim 1 characterized by the additional step of displacing with water the regenerated scrubber liquor matrix of said sludge removed from said second sludge blanket before subjecting said sludge to oxidation.

* * * * *